US006957774B1

(12) United States Patent
Sung

(10) Patent No.: US 6,957,774 B1

(45) Date of Patent: Oct. 25, 2005

(54) LUMINESCENT CARD AND CASING ASSEMBLY

(75) Inventor: Chih-Hung Sung, Shulin (TW)

(73) Assignee: King House Technology Co., Ltd., Taipei (TW)

( * ) Notice: Subject to any disclaimer, the term of this patent is extended or adjusted under 35 U.S.C. 154(b) by 0 days.

(21) Appl. No.: 11/029,141

(22) Filed: Jan. 3, 2005

(30) Foreign Application Priority Data

Aug. 13, 2004 (TW) .............................. 93124320 A

(51) Int. Cl.[7] .......................... G06K 19/06; G06K 7/10

(52) U.S. Cl. ...................... 235/454; 235/491; 235/486; 235/487

(58) Field of Search ................................ 235/455, 454, 235/457, 462.01, 462.05, 468, 494, 493, 235/491, 486, 487, 492, 382; 705/43, 44; 340/5.4, 5.86

(56) References Cited

U.S. PATENT DOCUMENTS

| | | | | |
|---|---|---|---|---|
| 4,092,526 | A * | 5/1978 | Beck | 235/487 |
| 4,656,473 | A * | 4/1987 | Goldman et al. | 340/5.86 |
| 4,734,695 | A * | 3/1988 | Goldman | 340/5.4 |
| 5,306,899 | A * | 4/1994 | Marom et al. | 235/382 |
| 5,570,207 | A * | 10/1996 | Chang | 359/2 |
| 6,001,510 | A * | 12/1999 | Meng et al. | 430/1 |
| 6,070,990 | A * | 6/2000 | Dalton et al. | 362/201 |
| 6,094,643 | A * | 7/2000 | Anderson et al. | 705/44 |
| 6,165,592 | A * | 12/2000 | Berger et al. | 428/195.1 |
| 6,824,049 | B2 * | 11/2004 | Lee et al. | 235/380 |
| 2001/0050314 | A1 * | 12/2001 | Lee et al. | 235/492 |
| 2005/0001711 | A1 * | 1/2005 | Doughty et al. | 340/5.74 |

FOREIGN PATENT DOCUMENTS

| | | | |
|---|---|---|---|
| JP | 2004223975 A | * | 1/2003 |
| JP | 2004-082584 A | * | 3/2004 |
| WO | WO 94/11203 | * | 5/1994 |

* cited by examiner

*Primary Examiner*—Thien M. Le
(74) *Attorney, Agent, or Firm*—Dellett & Walters

(57) ABSTRACT

A luminescent card and casing assembly has a luminescent card and a casing. The luminescent card has a plastic layer, a luminescent layer and a memory device. The luminescent card is inserted into the casing, the casing provides electricity to the luminescent card, and the luminescent card emits light. Only a few specific manufacturers make the luminescent layer so if criminals try to counterfeit any luminescent card device, law enforcement agents are able to trace the criminals through the luminescent layer manufacturers. The issuing banks and card companies do not lose money from any counterfeit cards.

7 Claims, 5 Drawing Sheets

LUMINESCENT CARD AND CASING ASSEMBLY

BACKGROUND OF THE INVENTION

1. Field of the Invention

The present invention relates to a card, and more particularly to a luminescent card and a casing assembly that is very difficult to counterfeit.

2. Description of Related Art

Cards such as credit cards, debit cards, cash cards and the like are widely used by consumers. Such cards allow consumers to make purchases without carrying cash, withdraw funds from accounts, take out preapproved loans and the like.

Because such cards are so conventional and frequently used, some criminals make counterfeit cards to make illegal profits. Counterfeiting cards is not very difficult. Materials and equipment to counterfeit cards are relatively easy to obtain. Because the origin of counterfeit cards is very difficult to trace, criminals judiciously using and selling the counterfeit cards often get away without being caught. The banks and the card companies suffer tremendous loses from these counterfeit cards.

To overcome the shortcomings, the present invention provides a luminescent card device and a power supply casing assembly to obviate or mitigate the aforementioned problems.

SUMMARY OF THE INVENTION

The primary objective of the present invention is to provide a luminescent card and a casing assembly that is very difficult to counterfeit.

The luminescent card and casing assembly has a luminescent card and a casing. The luminescent card has a plastic layer, a luminescent layer and a memory device. The luminescent card is inserted into the casing, the casing provides electricity to the luminescent card and the luminescent card emits light. Only a few specific manufacturers make the luminescent layer so if criminals try to counterfeit any luminescent card device, law enforcement agents are able to trace the criminals through the luminescent layer manufacturers. The issuing banks and card companies do not lose money from any counterfeit cards.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
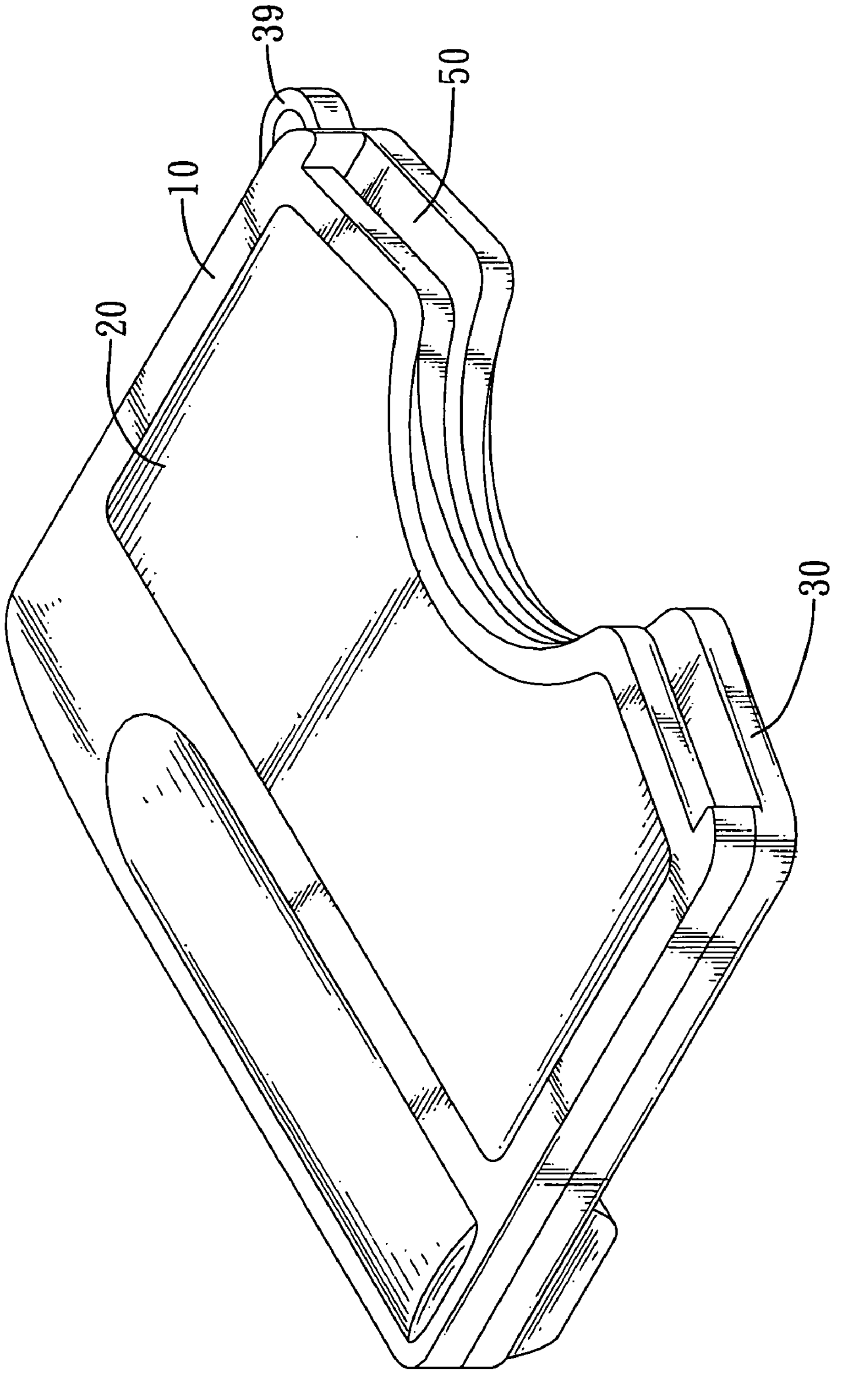
FIG. 1 is a perspective view of a casing for a luminescent card and casing assembly in accordance with the present invention.
Figure 2:
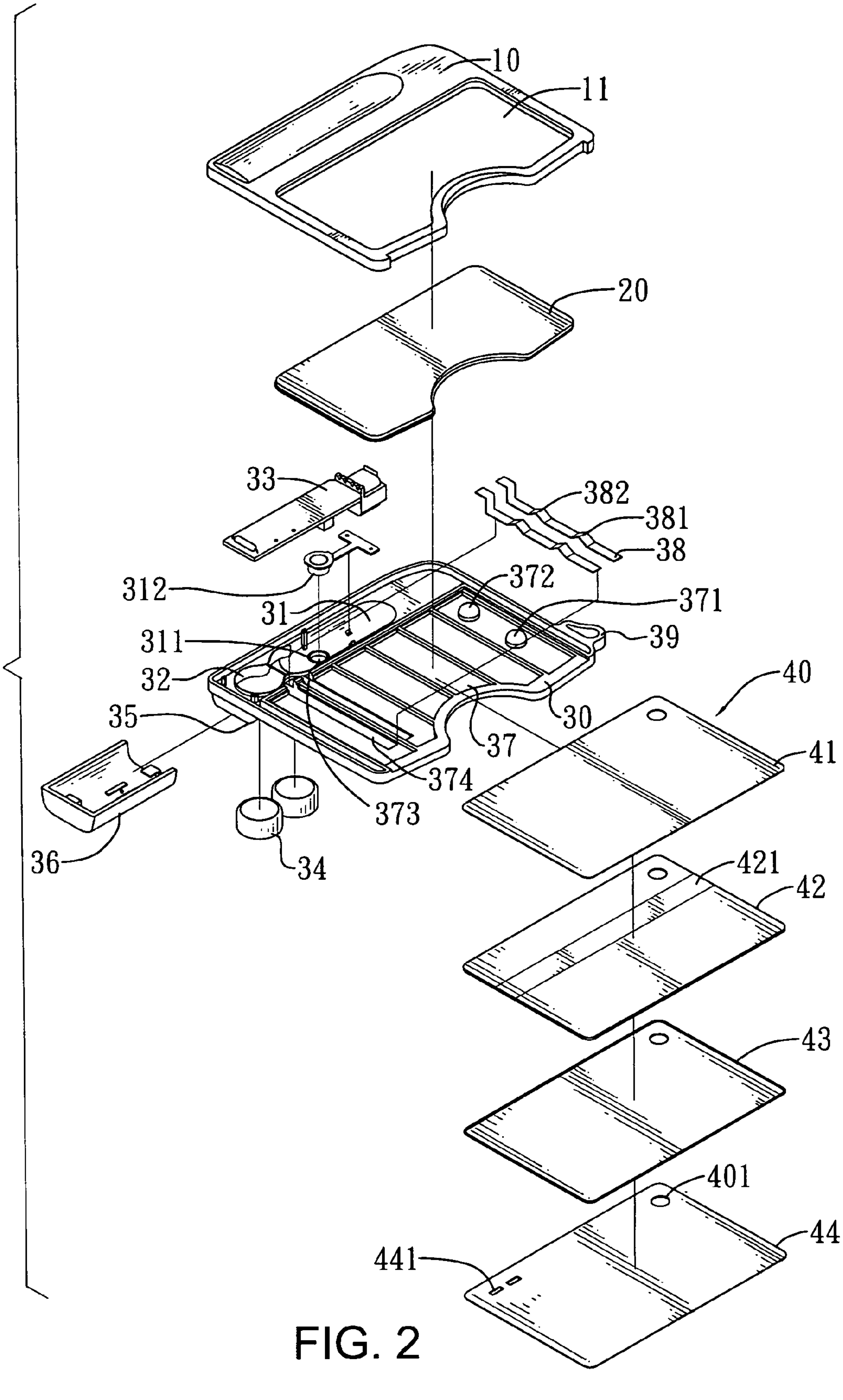
FIG. 2 is an exploded perspective view of a luminescent card and casing assembly in accordance with the present invention.

With reference to FIGS. 1 and 2, a luminescent card and casing assembly in accordance with the present invention comprise a casing and a luminescent card (40).

The casing comprises an upper casing (10), a lower casing (30), a circuit board (33), multiple batteries (34) and a card slot (50) and has a rear edge and a front edge.

The upper casing (10) has an inner surface, a front edge, a top surface, a concave recess, a through hole (11) and a light-permeable panel (20). The concave recess is formed in the front edge. The through hole (11) is formed through the top surface. The light-permeable panel (20) is mounted in the through hole (11) and allows light inside the casing to shine through the light-permeable panel (20).

The lower casing (30) is attached to the upper casing (10) and has an inner surface, an outer surface, a rear edge, a front edge, two side edges, a concave recess, an electronics recess (31), a battery compartment, a card recess (37) and an eye (39).

The inner surface faces and attaches to the inner surface of the upper casing (10).

The concave recess is formed in the front edge and corresponds to the concave recess in the front edge of the upper casing (10).

The electronics recess (31) is formed in the inner surface of the lower casing (30) near the rear edge of the lower casing (30) and has a bottom surface, a through hole (311) and a push button (312). The through hole (311) is formed through the bottom surface of the electronics recess (31). The push button (312) is mounted in the electronics recess (31) and protrudes through the through hole (311) in the electronics recess (31).

Figure 4:
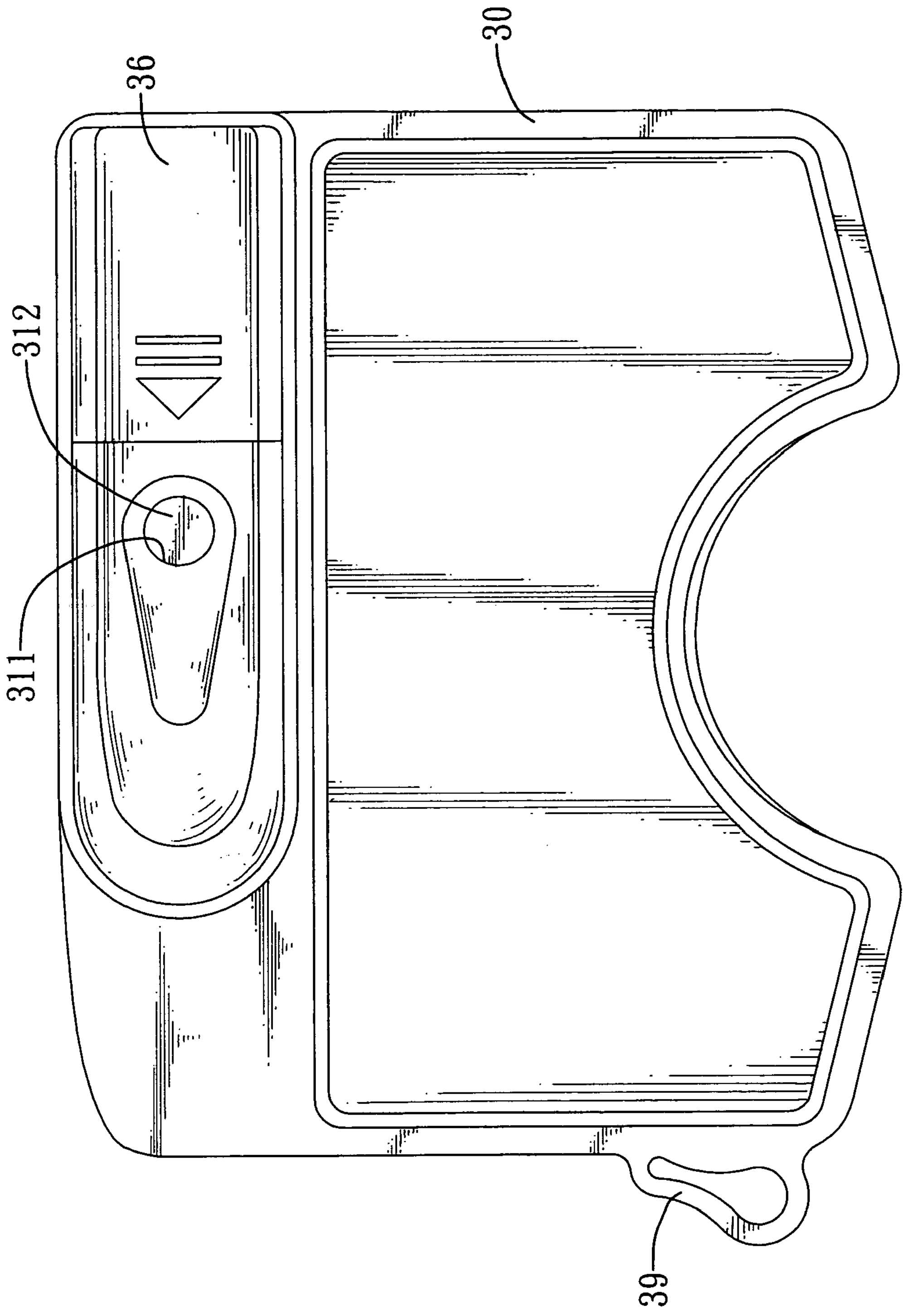
FIG. 4 is a bottom view of the casing in FIG. 1.

The battery compartment is formed in the inner surface of the lower casing (30) near the rear edge and a side edge of the lower casing (30) and comprises a battery recess (32) and a cover (36). The battery recess (32) is formed in the lower casing (30) near the rear edge and a side edge of the lower casing (30) and has a through hole (35). The through hole (35) is formed through the outer surface of the lower casing (30). With further reference to FIG. 4, the cover (36) is mounted detachably on the outer surface of the lower casing (30) over the through hole (35) in the battery recess (32).

The card recess (37) is formed in the inner surface of the lower casing (30) and has a recessed bottom surface, two contact slots (374), two contact openings (373), two linear contacts (38) and two curved protrusions (371, 372). The contact slots (374) are formed in the recessed bottom surface of the card recess (37). The contact openings (373) are formed in the recessed bottom surface between the contact slots (374) and the battery recess (32). The linear contacts (38) are mounted in the contact slots (374) and extend through the contact openings (373) into the battery recess (32), and each linear contact (38) has a first transverse contact (381) formed near the front edge of the casing and a second transverse contact (382) formed farther from the front edge of the casing. The transverse contacts (381, 382) are formed across the linear contact (38) and extend up into the card recess (37).

The curved protrusions (371, 372) comprise a first curved protrusion (371) and a second curved protrusion (372). The first curved protrusion (371) is formed on the recessed bottom surface near the front edge of the card recess (37) and extends up into the card recess (37). The second curved protrusion (372) is formed on the recessed bottom surface farther from the front edge of the card recess (37) and extends up into the card recess (37).

The eye (39) is formed on the side edge opposite to the battery compartment near the front edge. The circuit board (33) is mounted in the battery recess (32) and the electronics recess (31) in the lower casing (30), is connected to the push button (312) and linear contacts (38) and has circuitry. The circuitry stores modes of operation, converts direct current to alternating current, selectively outputs the alternating current to the linear contacts (38) based on an input signal and controls, interrupts or initiates the alternating current.

The batteries (34) are mounted in the battery recess (32) in the battery compartment and connect to the circuit board (33).

The card slot (50) is formed in the front edge of the casing by the card recess (37) of the lower casing (30) being enclosed by the upper casing (10).

Figure 3:
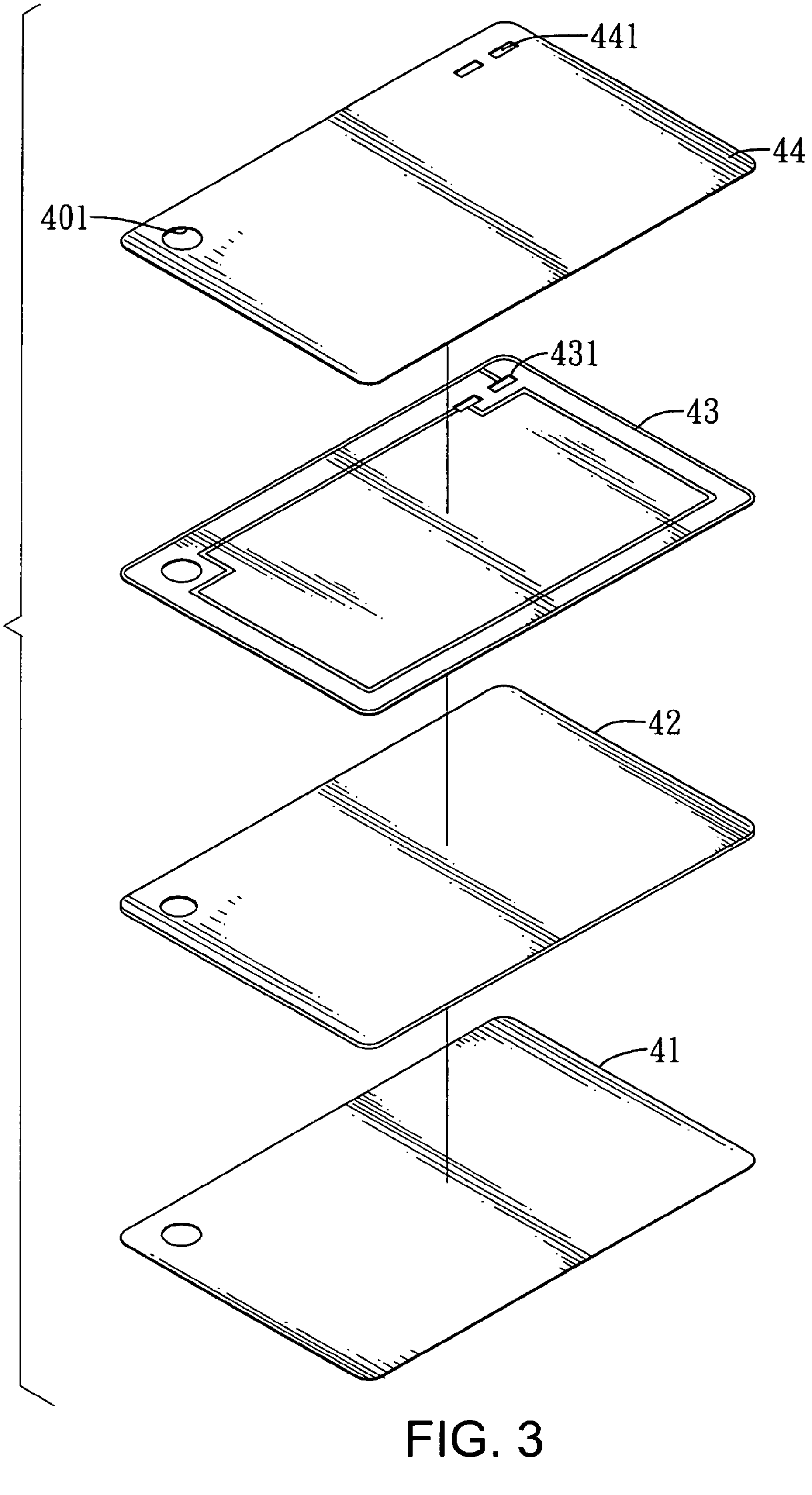
FIG. 3 is an exploded perspective view of the luminescent card in FIG. 2.

With reference to FIGS. 2 and 3, the luminescent card (40) comprises a plastic layer (42), a luminescent layer (43), a memory device (421), multiple printed areas, two protective layers (41, 44) and a detent (401) and has a top surface and a bottom surface.

The plastic layer (40) may be transparent or translucent and has a top surface and a bottom surface.

The luminescent layer (43) is electroluminescent material that emits light when subjected to a capacitive field of an alternating current, is attached to the plastic layer (40) and has a top surface, a bottom surface, two surface contacts (431) and at least one embedded capacitor. The top surface of the luminescent layer (43) is attached to the bottom surface of the plastic layer (42). The surface of the luminescent layer (43) not attached to the plastic layer is exposed. The surface contacts (431) are mounted on the exposed surface of the luminescent layer (43). The embedded capacitor is mounted in the electroluminescent material of the luminescent layer (43) and is connected to the surface contacts (431).

The memory device (421) is attached to the top surface of the plastic layer (42) and may be a magnetic strip or a memory chip.

The printed areas printed on the top surface and the bottom surface of the luminescent card (40) around the memory device (421) and the surface contacts (431) and are light-permeable. Information printed on the luminescent card may include bank information, a card number, a cardholder's photo, a cardholder's signature and the like.

The protective layers (41, 44) are attached to the top surface and the bottom surface of the luminescent card (40), are transparent and may be a clear or colored adhesive film. The protective layer (44) on the bottom surface has two contact holes (441) formed through the light-permeable layer (44). The contact holes (441) correspond to and expose the surface contacts (431) on the luminescent layer (43).

The detent (401) is formed through the luminescent card (40).

The luminescent card (40) is able to function as a card such as a credit card, debit card, cash card and the like. The luminescent card (40) can insert into the casing from the card slot (50) of the casing.

Figure 5:
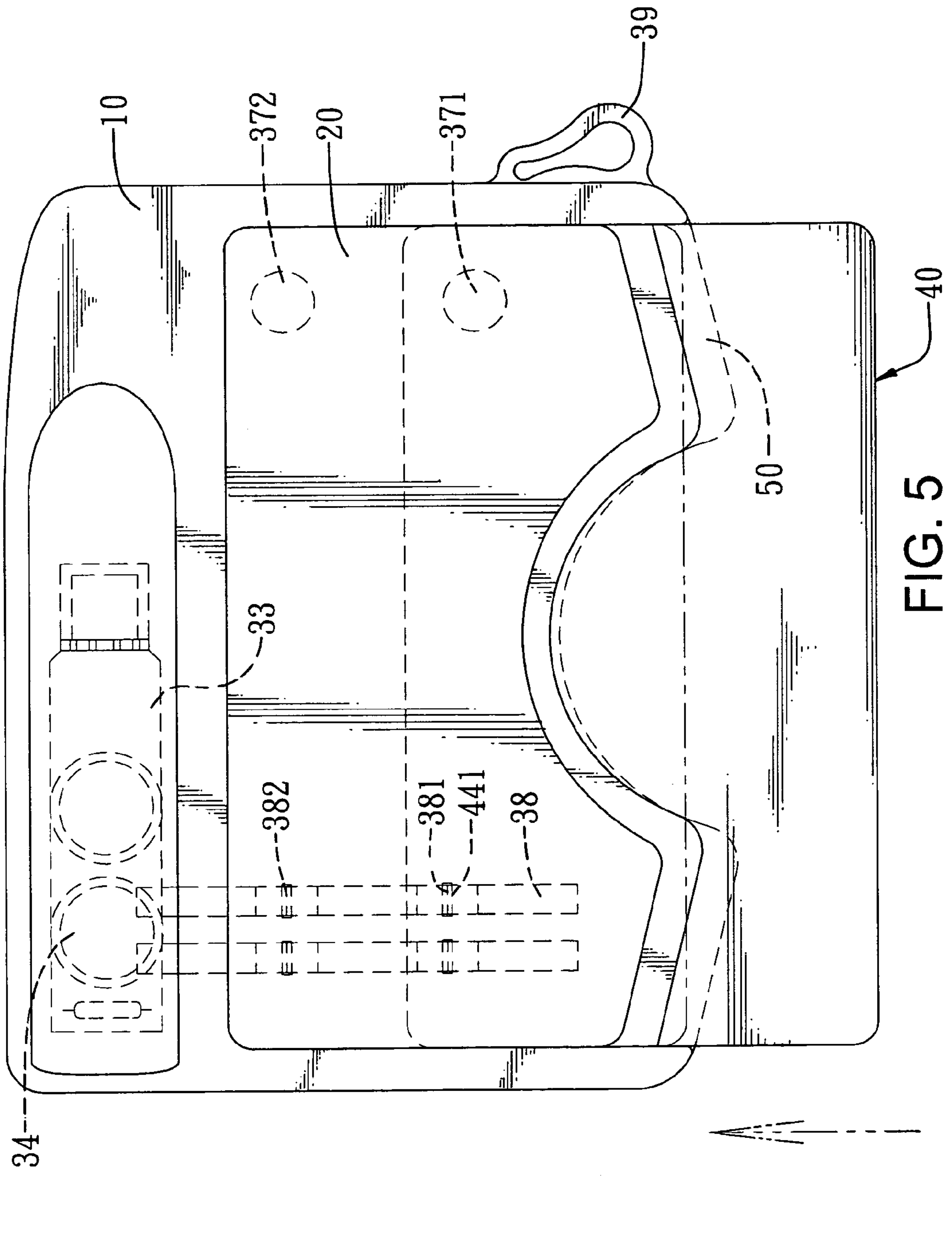
FIG. 5 is an operational top view of the luminescent card and casing assembly in FIG. 1.

With reference to FIG. 5, when the luminescent card (40) inserts into the casing, the curved protrusion (371) nearest the front edge of the luminescent card (40) extends into the detent (401) to keep the luminescent card (40) from moving further into the casing. The transverse contacts (381) nearest the front edge of the luminescent card (40) make contact with the surface contacts (431) on the luminescent layer (43) to allow electricity to pass to the luminescent layer (43). The luminescent card (40) flashes for a short period of time and stops emitting light. Pressing the push button (312) again will cause electricity to be applied to the luminescent layer (43) again.

Pushing the luminescent card (40) further into the casing causes the second curved protrusion (372) to extend into the detent (401) and hold the luminescent card (40) in position. The transverse contacts (382) make contact with the surface contacts (431) on the luminescent layer (43) and the luminescent card (40) flashes for a short period of time. Pressing the push button (431) will cause the luminescent card (40) to flash again.

Furthermore, only a few specific manufacturers make the luminescent layer (42) so criminals cannot possibly counterfeit any luminescent card device. If criminals do manage to counterfeit the luminescent card device, law enforcement agents will be able to trace the criminals through the luminescent layer (42) manufacturers.

In conclusion, the casing provides the electricity to the luminescent card, and the luminescent card emits light, and more particularly, the luminescent layer (42) makes counterfeiting the luminescent card impossible. Issuing banks and the card companies will save money previously lost from counterfeit cards.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A luminescent card and casing assembly comprising
- a luminescent card having a top surface and a bottom surface and comprising
  - a plastic layer having
    - a top surface; and
    - a bottom surface;
  - a luminescent layer being electroluminescent material, attached to the plastic layer and having
    - a top surface attached to the bottom surface of the luminescent layer;
    - a bottom surface;
    - two surface contacts mounted on the luminescent layer;
  - a memory device attached to the top surface of the plastic layer;
  - two protective layers attached to the top surface and the bottom surface of the luminescent card, and one of the protective layers having two contact holes formed through the protective layer and corresponding to and exposing the surface contacts on the luminescent layer; and
  - a detent formed through the luminescent card; and
- a casing having a rear edge and a front edge and comprising
  - an upper casing having
    - an inner surface;
    - a front edge;
    - a top surface;
    - a concave recess formed in the front edge;
    - a through hole formed through the top surface; and
    - a light permeable panel mounted in the through hole;

a lower casing attached to the upper casing and having
  an inner surface facing and attaching to the inner surface of the upper casing;
  an outer surface;
  a rear edge;
  a front edge;
  two side edges;
  a concave recess formed in the front edge and corresponding to the concave recess in the front edge of the upper casing;
  an electronics recess formed in the inner surface of the lower casing near the rear edge of the lower casing and having
    a bottom surface;
    a through hole formed through the bottom surface of the electronics recess; and
    a push button mounted in the electronics recess and protruding through the through hole in the electronics recess; and
  a battery compartment formed in the inner surface of the lower casing near the rear edge and a side edge of the lower casing and comprising
    a battery recess formed in the lower casing near the rear edge and a side edge of the lower casing and having a through hole formed through the outer surface of the lower casing; and
    a cover mounted detachably on the outer surface of the lower casing over the through hole in the battery recess;
  a card recess formed in the inner surface of the lower casing and having
    a recessed bottom surface;
    two contact slots formed in the recessed bottom surface of the card recess;
    two contact openings formed in the recessed bottom surface between the contact slots and the battery recess;
    two linear contacts mounted in the contact slots and the battery recess and extending through the contact openings into the battery recess, and each linear contact having
      a first transverse contact formed near the front edge of the casing across the linear contact and extending up into the card recess; and
      a second transverse contact formed farther from the front edge of the casing across the linear contact and extending up into the card recess; and
    two curved protrusions comprising
      a first curved protrusion formed on the recessed bottom surface near the front edge of the card recess and extending up into the card recess; and
      a second curved protrusion formed on the recessed bottom surface farther from the front edge of the card recess and extends up into the card recess; and
  an eye formed on the side edge opposite to the battery compartment near the front edge;
a circuit board mounted in the battery recess and the electronics recess in the lower casing, connecting to the push button and linear contacts;
multiple batteries mounted in the batter recess in the battery compartment and connected to the circuit board; and
a card slot formed in the front edge of the casing by the card recess of the lower casing being enclosed by the upper casing and allowing the luminescent card to be inserted into the casing.

2. The luminescent card and casing assembly as claimed in claim 1, wherein the plastic layer of the luminescent card is transparent.

3. The luminescent card and casing assembly as claimed in claim 1, wherein the plastic layer of the luminescent card is translucent.

4. The luminescent card and casing assembly as claimed in claim 1, wherein the memory device is a magnetic strip.

5. The luminescent card and casing assembly as claimed in claim 1, wherein the memory device is a memory chip.

6. The luminescent card and casing assembly as claimed in claim 1, wherein the protective layers are clear adhesive films.

7. The luminescent card and casing assembly as claimed in claim 1, wherein the protective layers are colored adhesive films.

* * * * *